United States Patent
Burgers

(10) Patent No.: US 11,294,454 B2
(45) Date of Patent: Apr. 5, 2022

(54) POSITION ERROR MEASUREMENT IN AN EXTENDED REALITY MOBILE DISPLAY DEVICE

(71) Applicant: DISPLAYLINK (UK) LIMITED, Cambridge (GB)

(72) Inventor: Peter Alan Burgers, Cambridgeshire (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 17/041,713

(22) PCT Filed: Mar. 27, 2019

(86) PCT No.: PCT/GB2019/050881
§ 371 (c)(1),
(2) Date: Sep. 25, 2020

(87) PCT Pub. No.: WO2019/186162
PCT Pub. Date: Oct. 3, 2019

(65) Prior Publication Data
US 2021/0124413 A1    Apr. 29, 2021

(30) Foreign Application Priority Data

Mar. 29, 2018 (GB) ..................... 1805139

(51) Int. Cl.
G09G 5/37 (2006.01)
G06F 3/01 (2006.01)

(52) U.S. Cl.
CPC ............. *G06F 3/012* (2013.01); *G09G 5/37* (2013.01); *G09G 2320/0252* (2013.01);
(Continued)

(58) Field of Classification Search
CPC .. G06F 3/012; G09G 5/37; G09G 2320/0252; G09G 2320/0261; G09G 2320/08; G09G 2370/16
See application file for complete search history.

(56) References Cited

U.S. PATENT DOCUMENTS 8,279,242 B2 * 10/2012 Bentley ................. G06F 1/1694
345/672
2011/0107415 A1 * 5/2011 Shen ..................... G06F 21/445
726/19

(Continued)

FOREIGN PATENT DOCUMENTS

WO    WO 97/42601    11/1997

*Primary Examiner* — Terrell M Robinson
(74) *Attorney, Agent, or Firm* — Paradice & Li LLP

(57) ABSTRACT

A method of determining relative position of an extended reality mobile display device connected to receive display data from a host device involves determining (S31), by the extended reality mobile display device, a position and orientation of the extended reality mobile display device at a transmit time and transmitting (S32) a first signal to the host device at the transmit time. The extended reality mobile display device then receives (S35) at a receive time a second signal transmitted (S34) from the host device upon receipt (S33) of the first signal. The extended reality mobile display device determines (S36) a position and orientation of the extended reality mobile display device at the receive time and determines a difference (S37) in the position and orientation of the extended reality mobile display device between the transmit and receive times. The extended reality mobile display device then corrects display data received from the host device based on the determined difference in the position and orientation of the extended reality mobile display device, and displays the corrected display data.

20 Claims, 3 Drawing Sheets

(52) U.S. Cl.
CPC . *G09G 2320/0261* (2013.01); *G09G 2320/08* (2013.01); *G09G 2370/16* (2013.01)

(56) References Cited

U.S. PATENT DOCUMENTS

| | | |
|---|---|---|
| 2014/0361976 A1 | 12/2014 | Osman et al. |
| 2015/0185018 A1* | 7/2015 | Hesch .................... G06T 7/246 701/501 |
| 2015/0185054 A1* | 7/2015 | Hesch .................. G01D 9/005 702/187 |
| 2016/0027141 A1 | 1/2016 | Patel et al. |
| 2016/0191722 A1* | 6/2016 | Fung ................. H04N 1/00204 348/207.1 |
| 2016/0252955 A1 | 9/2016 | Yamamoto et al. |
| 2016/0357017 A1* | 12/2016 | Nishidate ........... G02B 27/0093 |
| 2017/0243324 A1 | 8/2017 | Mierle et al. |
| 2018/0165885 A1 | 6/2018 | Rodriguez, II |

\* cited by examiner

POSITION ERROR MEASUREMENT IN AN EXTENDED REALITY MOBILE DISPLAY DEVICE

CROSS-REFERENCE TO RELATED APPLICATIONS

This application is a U.S. national stage application under 35 U.S.C. § 371 of International Patent Application No. PCT/GB2019/050881, filed on Mar. 27, 2019, which claims the benefit of Great Britain Patent Application No. 1805139.1 filed on Mar. 29, 2018, the contents of each of which are incorporated herein by reference in their entirety.

BACKGROUND

When a host computing device transmits display data to a mobile display device such as a virtual-reality headset, a delay is introduced between the production of the display data and its actual display by or in the headset. This delay may be increased where the connection between the two devices is wireless.

Especially in the case of a virtual-reality headset worn by a user, the mobile device may be in constant motion relative to the host device and the user will expect this motion to be reflected in the images shown by the headset. The increased latency in the time between the generation of the display data by the host device and its display may cause delay in the apparent movement of the images displayed, which may result in a poor user experience. This delay and the resulting visual artefacts are known as position error.

The methods and systems of the invention provide a relatively low-cost method of determining position error to try to mitigate this problem.

SUMMARY

Accordingly, in a first aspect, the invention provides a method of determining relative position of an extended reality mobile display device connected to receive display data from a host device, the method comprising:

determining, by the extended reality mobile display device, a position and orientation of the extended reality mobile display device at a transmit time;

transmitting, by the extended reality mobile display device, at least a first signal to the host device at the transmit time;

receiving, by the extended reality mobile display device, at least a second signal at a receive time, the second signal being transmitted from the host device upon receipt of the first signal thereat;

determining, by the extended reality mobile display device, a position and orientation of the extended reality mobile display device at the receive time;

determining, by the extended reality mobile display device, a difference in the position and orientation of the extended reality mobile display device between the transmit and receive times;

correcting, by the extended reality mobile display device, display data received from the host device based on the determined difference in the position and orientation of the extended reality mobile display device; and displaying the corrected display data at the extended reality mobile display device.

In one embodiment, the position and orientation of the extended reality mobile display device is transmitted in the first signal to the host device and is returned to the extended reality mobile display device in the second signal.

In an embodiment, a plurality of first signals are transmitted to the host device at different transmit times and a plurality of second signals are received at the extended reality mobile display device at different receive times, each second signal corresponding to a particular first signal.

In an embodiment, a position and orientation of the extended reality mobile display device is determined at each transmit time and at each receive time and the difference in the position and orientation of the extended reality mobile display device is determined between the position and orientation of the extended reality mobile display device at a corresponding transmit time and a corresponding receive time.

The display data may be received in a frame and the correction of the display data is based on the difference in the position and orientation of the extended reality mobile display device between the transmit and receive times closest in time to a predetermined point of the received frame.

The position and orientation of the extended reality mobile display device may be transmitted in the corresponding first signal to the host device and may be returned to the extended reality mobile display device in the corresponding second signal.

A list of the plurality of first signals may be stored at the extended reality mobile display device together with the corresponding position and orientation of the extended reality mobile display device. In an embodiment, the transmit times of the plurality of first signals are stored with the list.

In an embodiment, the plurality of first signals are transmitted to the host device with an adjustable frequency, which may be adjusted based on at least the determined difference in the position and orientation of the extended reality mobile display device between the transmit and receive times, such that, if the difference is high, the frequency is increased, and if the difference is low, the frequency is decreased.

In an embodiment, a different identification is included in each of the plurality of first signals and the identification is included in the second signal corresponding to the first signal.

The position and orientation of the extended reality mobile display device at the transmit time and/or at the receive time may be determined from sensor data on the extended reality mobile display device.

Alternatively, the position and orientation of the extended reality mobile display device at the transmit time may be determined as reference value and the position and orientation of the extended reality mobile display device at the receive time may be determined from movement data of the extended reality mobile display device between the transmit time and the receive time. In an embodiment, the movement data is received from an accelerometer and the position and orientation of the extended reality mobile display device at the receive time is determined by double integrating acceleration data between the transmit time and the receive time.

The position and orientation of the extended reality mobile display device may be determined using x, y and z axis location in space, roll rotation, pitch rotation and yaw rotation.

According to a second aspect, the invention provides an extended reality mobile display device configured to perform a method as described above.

In a third aspect, the invention provides an extended reality system comprising an extended reality mobile display device as described above and a host device connected thereto. In an embodiment, the connection is a wireless connection.

In a fourth aspect, the invention provides a computer readable medium comprising instructions executable by a processing module, which when executed by the processing module, cause the processing module to perform the method as described above.

In a further aspect, the invention provides a method for determining the position error—i.e. the distance moved by a mobile device in the time required for a signal and its response to travel between the mobile device and a connected host—comprising:
1. The mobile device determining its current position (Pn);
2. The mobile device transmitting a "Ping" message to the host;
3. The host receiving the "Ping" message;
4. The host transmitting a "Pong" message to the mobile device;
5. The mobile device receiving the "Pong" message;
6. The mobile device determining its new position (Pn');
7. The mobile device calculating the movement between Pn and Pn'.

This method allows position error to be determined with minimal processing, sensing or bandwidth requirements, meaning that it has very little effect on the normal operation of the mobile device and its connection to the host.

BRIEF DESCRIPTION OF THE DRAWINGS

Embodiments of the invention will now be more fully described, by way of example, with reference to the drawings, of which.

DETAILED DESCRIPTION OF THE DRAWINGS

Figure 1:
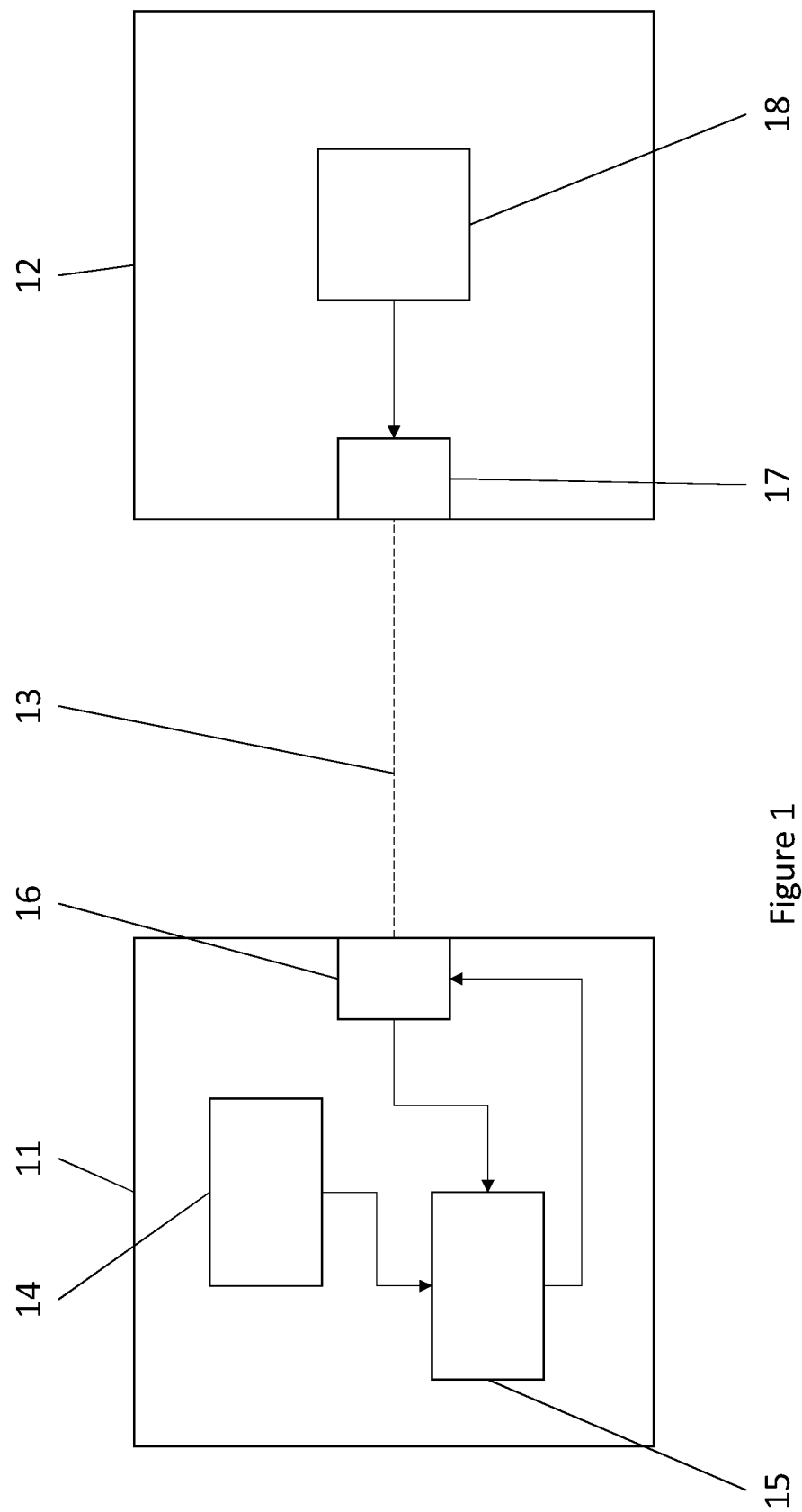
FIG. 1 shows an embodiment of a mobile device connected to a host device.

FIG. 1 shows two wirelessly connected devices: an extended reality device [11] such as a VR or AR headset and a host device [12]. The host device [12] provides display and other data to the extended reality device [11].

The host device [12] includes, among other components, a processing module [18] which produces data to be transmitted to the extended reality device [11]. The processing module [18] is connected to a radio controller [17] which controls a wireless connection [13] between the host device [12] and the extended reality device [11]. The radio controller [17] is capable of determining when it has received signals and data from the extended reality device [11] and can direct them appropriately or react to them itself as appropriate. This may include sending messages to the extended reality device [11] independently of the operation of the processing module [18].

The extended reality device [11] includes, among other components, a radio controller [16] which controls the wireless connection [13] with the host device [12]. The wireless connection [13] is between this radio controller [16] and the corresponding radio controller [17] on the host device [12]. The radio controller [16] is connected to a processing module [15] on the extended reality device [11] which processes data received from the host device [12] and also produces data and signals to be transmitted to the host device [12]. The processing module [15] is in turn connected to one or more position sensors [14] which determines the position and orientation of the extended reality device [11], either as an absolute value or relative to a starting point. For this purpose, the term 'position' refers to a combination of attributes which may include location in space, roll rotation, pitch rotation, and yaw rotation, depending on the circumstances.

For example, the position sensors [14] may include a combination of an accelerometer which determines the exact location of the extended reality device [11] by detecting motion in various planes, and a gyroscope, which detects rotation. Alternatively, the position sensor [14] may determine the position of the extended reality device [11] within a space by triangulating between signals from multiple acoustic, radio, or magnetic antennae, or it may determine the movements of the extended reality device [11] from a starting point in order to determine the position of the extended reality device [11] relative to that starting point, irrespective of its absolute position, or it may use a combination of methods.

The use of an accelerometer as a sensor [14] only requires the amount of movement and its direction, not its exact starting and ending points. In the example of a virtual-reality headset, head-tracking data from a variety of position sensors [14] is gathered as part of the normal operation of the extended reality device [11] and this may be used. Often, it is not available on the extended reality device [11] as it is usually only sent to the host device [12] for production of display data. An accelerometer is low-cost and relatively low-latency while allowing the relative position of the extended reality device [11] to be determined.

In any case, the processing module [15] can receive position data from the sensor [14] and use it in calculations and/or transmit it to the radio controller [16].

Figure 2:
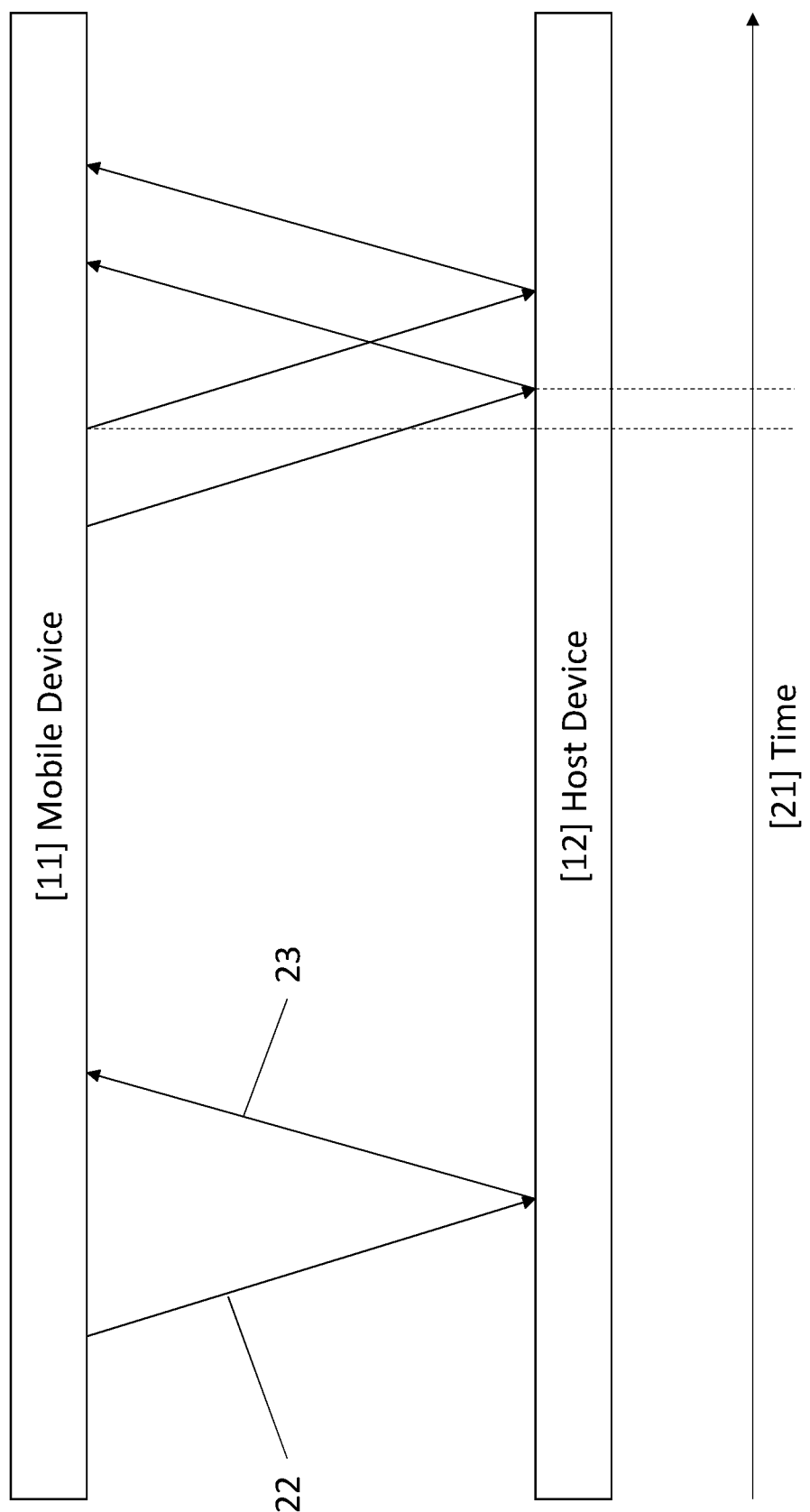
FIG. 2 shows signals sent between the devices over time.

FIG. 2 shows the signals transmitted over time between the extended reality device [11] and the host device [12] in two possible embodiments. The extended reality device [11] is represented by a bar at the top of the Figure while the host device [12] is represented by a similar bar at the bottom of the Figure. The passage of time [21] is represented by the arrow at the bottom of the Figure, showing that time has passed between the left side of the Figure and the right side of the Figure. Accordingly, the positions of the arrows representing the signals [22, 23] exchanged between the devices [11, 12] represent points in time, not components of the devices [11, 12].

The first case, on the left, is the most straightforward though the practical benefits may be limited. In this case one signal [22, 23] is "in flight" at a time. In this case, a first "ping" signal [22] is sent from the radio controller [16] on the extended reality device [11] to the radio controller [17] on the host device [12]. The radio controller [17] on the host device [12] then responds with a "pong" signal [23]. In this case, because there is only one signal in flight at a time, there is no need for the extended reality device [11] to keep a record of the signals, as the "pong" signals [23] will not arrive out of order.

In the second case, on the right, a stream of "ping" signals [22] is transmitted at intervals, regardless of whether the corresponding responding "pong" signals [23] have been received. This can mean that, as indicated in the Figure by vertical dashed lines, a "ping" signal [22] may be transmitted before the previous "ping" signal [22] has been received by the host device [12]. This means that the extended reality device [11] may need to keep a record of the "ping" signals

[22] transmitted and their times of transmission, as well as ensuring that the "ping" signals [22] and their corresponding responding "pong" signals [23] can be identified.

The determination of how frequently and regularly "ping" signals [22] should be transmitted may be determined by a number of heuristics. For example, the extended reality device [11] may dynamically adjust the rate at which the "ping" signals are sent according to the current latency—i.e. the time between the generation of a frame of display data and its display on a display device—such that if latency is high, position is measured less frequently and therefore the "ping" signals [22] are transmitted less frequently. Alternatively, latency may be an indicator of how accurately the radio controller [17] on the host device [12] is transmitting a directional signal and the rate of sending the "ping" signals may be determined via the current position error such that "ping" signals are transmitted more frequently if the position error is high, allowing it to be corrected more accurately. The rate at which "ping" signals are transmitted may be affected by the frame rate, but is not dependent on it.

Overall, more frequent "ping" signals allow the extended reality device [11] to measure the current position error due to latency in real time, which means that it can immediately adapt to changes in transport latency. Thus, variation in one of these measures or another measure of wireless connection performance may be similarly used such that at times of high variability "ping" signals [22] are transmitted more frequently.

Figure 3:
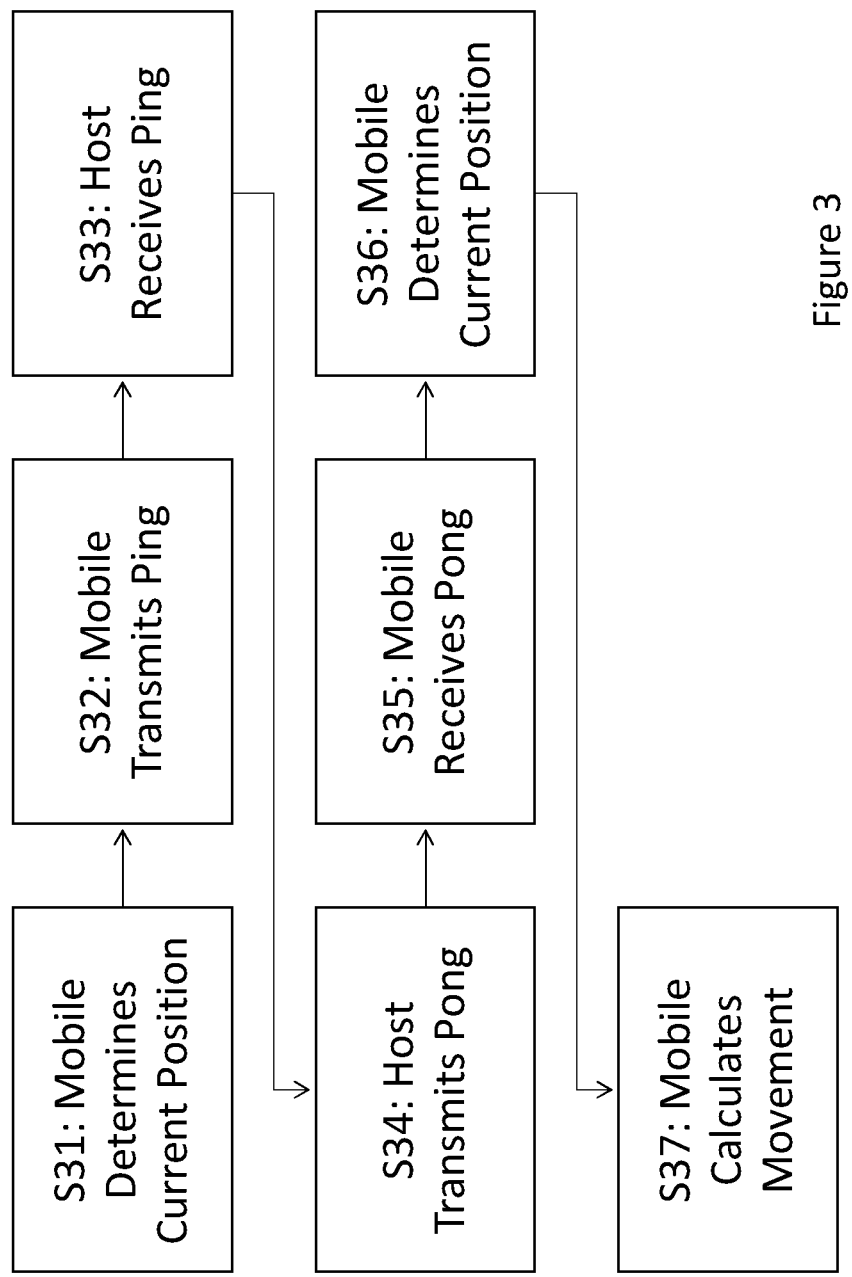
FIG. 3 shows a flowchart illustrating the method used by the devices in an embodiment of the invention.

These cases will be further described with reference to FIG. 3, which describes the process of for an embodiment of the invention.

At Step S31, the extended reality device [11] detects its current position. Depending on the position sensor(s) [14] in use, this may involve calculating movement from a previous reference point according to an accelerometer, or according to changes in image processing of data from an external camera attached to the extended reality device [11], or any other method appropriate to the type of position sensor(s) [14]. This position is passed from the position sensor(s) [14] to the processing module [15] on the extended reality device [11] and stored.

Alternatively, the radio controller [16] on the extended reality device [11] may be connected directly to the position sensor(s) [14] such that when it receives a command to transmit a "ping" signal [22] it is able to fetch the current position of the extended reality device [11] directly.

At Step S32, the processing module [15] on the extended reality device [11] instructs the radio controller [16] to send a "ping" signal [22] to the host device [12]. In the case where there are many "ping" signals [22] in flight, the processing module [15] may store a list of the "ping" signals [22] currently in flight, together with the associated position data and, optionally, their times of transmission. This list may be stored on a first-in-first-out ("FIFO") basis, if it can be assumed that the corresponding responding "pong" signals [23] will arrive in the order in which the "ping" signals [22] were transmitted, or it may be stored in a keyed format such that each "ping" signal [22] has a unique reference which is then carried by its corresponding "pong" signal [23]. Finally, instead of storing the initial position on the mobile device [11], it could be sent as payload data of the "ping" signal [22].

At Step S33, the radio controller [17] on the host device [12] receives the transmitted "ping" signal [22]. It then immediately responds by transmitting a "pong" signal [23] to the radio controller [16] on the extended reality device [11] at Step S34. If the received "ping" signal [22] includes a unique reference and/or initial position data, this might be included in the "pong" signal [23] in order to indicate which "ping" signal [22] it is responding to, in case the "ping" signals [22] and "pong" signals [23] arrive out of order. Alternatively, the radio controller [17] on the host device [12] might signal the processing module [18] to indicate that a "ping" signal [22] has been received and the processing module [18] might then instruct the radio controller [16] to command it to transmit the "pong" signal [23].

At Step S35, the radio controller [16] on the extended reality device [11] transmits a signal to the processing module [15] to indicate that a "pong" signal [23] has been received. This may include the reference number and/or initial position data associated with the original "ping" signal [22] if it is available. The processing module [15] then determines the extended reality device's [11] new position at Step S36. This will again involve an operation appropriate to the position sensor(s) [14], for example subtracting the current location from the original location or double-integrating acceleration data between the time at which the "ping" signal [22] was sent and the time at which the "pong" signal [12] was received in order to provide the distance that the extended reality device [11] has moved in that time. Similar methods might be used for other relative positions, or if the position sensor(s) [14] determines an absolute position relative to an external space, the position sensor(s) [14] may be able to provide that position.

At Step S37, the processing module [15] uses the original and current positions of the extended reality device [11] to calculate the distance that the extended reality device [11] has moved between the transmission of the "ping" signal [22] and receipt of the corresponding "pong" signal [23]. This can then be used to adjust position-dependent data received from the host device [12] to take into account movement that may occur in the time between position data being transmitted to the host device [12] and data that may have been generated based on that sensor data being received from the host device [12]. For example, the processing module [15] may carry out asynchronous reprojection, a technique in which a previous frame is warped using new tracking data. In this case, the processing module [15] would use the position error to calculate a continuation of the sensor data used to create the frame and transform the image data contained in the frame as appropriate.

An example application is a virtual-reality headset receiving data from a local host device such as a gaming console or across a network, including the internet, in which the location and pose of the headset are used to determine what display data will be displayed on its internal display device. If the user, and therefore the headset, have moved in between the transmission of position data and the receipt of appropriate display data, the display data may be slightly out of date, which may mean lag between when the user expects a movement to affect the display data and the actual change in the display data. This leads to a poor user experience. If the headset is able to determine this error, it may be able to amend the received display data accordingly.

These methods may be carried out at any point in the generation and display of a frame. It may be most convenient to perform them at the beginning of every frame, but the position error may be determined at the end of the frame or at a consistent point between the beginning and end of the frame. Alternatively, several "ping" signals could be transmitted during the frame and the average measurement from the received "pong" signals could be used.

Although only a few particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa.

The invention claimed is:

1. A method of determining a relative position of an extended reality mobile display device connected to receive display data from a host device, the method comprising:
   determining, by the extended reality mobile display device and using one or more sensors of the extended reality mobile display device, a position and an orientation of the extended reality mobile display device at a transmit time;
   transmitting, by the extended reality mobile display device, at least a first signal to the host device at the transmit time;
   receiving, by the extended reality mobile display device, at least a second signal at a receive time, the second signal being transmitted from the host device upon a receipt of the first signal thereat;
   determining, by the extended reality mobile display device and using the one or more sensors, a position and an orientation of the extended reality mobile display device at the receive time;
   determining, by the extended reality mobile display device, a spatial relationship between the respective position and the orientation of the extended reality mobile display device at the transmit time and the receive time;
   correcting, by the extended reality mobile display device, display data received from the host device based on the determined spatial relationship between the respective position and the orientation of the extended reality mobile display device at the transmit time and the receive time; and
   displaying the corrected display data at the extended reality mobile display device.

2. The method of claim 1, wherein the position and the orientation of the extended reality mobile display device at the transmit time are transmitted in the first signal to the host device and are returned to the extended reality mobile display device in the second signal.

3. The method of claim 1, wherein a plurality of first signals are transmitted to the host device at different transmit times and a plurality of second signals are received at the extended reality mobile display device at different receive times, each second signal corresponding to a particular first signal.

4. The method of claim 3, wherein a position and an orientation of the extended reality mobile display device is determined at each transmit time and at each receive time and respective spatial relationships between the respective position and the orientation of the extended reality mobile display device are determined for a corresponding transmit time and a corresponding receive time.

5. The method of claim 4, wherein the display data is received in a frame and the correction of the display data is based on the spatial relationship between the respective position and the orientation of the extended reality mobile display device between the transmit time and the receive time closest in time to a predetermined point of the received frame.

6. The method of claim 4, wherein the respective position and the orientation of the extended reality mobile display device are transmitted in the corresponding first signal to the host device and are returned to the extended reality mobile display device in the corresponding second signal.

7. The method of claim 4, wherein a list of the plurality of first signals is stored at the extended reality mobile display device together with the corresponding position and orientation of the extended reality mobile display device.

8. The method of claim 7, wherein the transmit times of the plurality of first signals are stored with the list.

9. The method of claim 3, wherein the plurality of first signals are transmitted to the host device with an adjustable frequency.

10. The method of claim 9, wherein the adjustable frequency of transmission of the plurality of first signals is adjusted based on at least the determined spatial relationship between the respective position and the orientation of the extended reality mobile display device at the transmit times and the receive times, such that, if the spatial relationship indicates a difference that is high, the frequency is increased, or if the difference is low, the frequency is decreased.

11. The method of claim 3, wherein each of the plurality of first signals includes a corresponding identification and the identification is included in the second signal corresponding to the first signal.

12. The method of claim 1, wherein the position and the orientation of the extended reality mobile display device at the transmit time are determined from sensor data obtained from the one or more sensors of the extended reality mobile display device.

13. The method of claim 1, wherein the position and the orientation of the extended reality mobile display device at the receive time are determined from sensor data obtained from the one or more sensors of the extended reality mobile display device.

14. The method of claim 1, wherein the position and the orientation of the extended reality mobile display device at the transmit time is determined as a reference value for the spatial relationship, and wherein the position and the orientation of the extended reality mobile display device at the receive time are determined from movement data of the extended reality mobile display device between the transmit time and the receive time.

15. The method of claim 14, wherein the one or more sensors includes an accelerometer, wherein the movement data is received from the accelerometer, and wherein the position and the orientation of the extended reality mobile display device at the receive time are determined by double integrating acceleration data between the transmit time and the receive time.

16. The method of claim 1, wherein the position and the orientation of the extended reality mobile display device are determined using an x, y, and z axis location in space, roll rotation, pitch rotation and yaw rotation.

17. An extended reality mobile display device connected to a host device, the extended reality mobile display device configured to:
   determine a position and an orientation of the extended reality mobile display device at a transmit time;
   transmit at least a first signal to the host device at the transmit time;
   receive at least a second signal at a receive time, the second signal being transmitted from the host device upon receipt of the first signal thereat;
   determine a position and an orientation of the extended reality mobile display device at the receive time;

determine a spatial relationship between the respective position and the orientation of the extended reality mobile display device at the transmit time and the receive time;

correct display data received from the host device based on the determined spatial relationship between the respective position and the orientation of the extended reality mobile display device at the transmit time and the receive time; and display the corrected display data.

18. An extended reality system comprising an extended reality mobile display device according to claim 17 and a host device connected thereto.

19. The extended reality system according to claim 18 wherein the connection is a wireless connection.

20. The extended reality system according to claim 18, wherein a plurality of first signals are transmitted to the host device at different transmit times and a plurality of second signals are received at the extended reality mobile display device, from the host device, at different receive times, each second signal corresponding to a particular first signal.

* * * * *